United States Patent
Senant

(10) Patent No.: US 12,360,250 B1
(45) Date of Patent: Jul. 15, 2025

(54) ELEVATION FILTERING OF SATELLITE SIGNALS

(71) Applicant: Zoox, Inc., Foster City, CA (US)

(72) Inventor: Eric Andre Senant, Albany, CA (US)

(73) Assignee: Zoox, Inc., Foster City, CA (US)

( * ) Notice: Subject to any disclaimer, the term of this patent is extended or adjusted under 35 U.S.C. 154(b) by 454 days.

(21) Appl. No.: 17/976,628

(22) Filed: Oct. 28, 2022

(51) Int. Cl.
*G01S 19/22* (2010.01)
*G01S 19/28* (2010.01)

(52) U.S. Cl.
CPC .............. *G01S 19/22* (2013.01); *G01S 19/28* (2013.01)

(58) Field of Classification Search
CPC ................................. G01S 19/22; G01S 19/28
See application file for complete search history.

(56) References Cited

U.S. PATENT DOCUMENTS

| | | | |
|---|---|---|---|
| 6,795,487 B1 * | 9/2004 | Bickerstaff | G01S 19/22 375/150 |
| 2010/0176992 A1 * | 7/2010 | T'siobbel | G01S 19/22 342/357.25 |
| 2016/0109556 A1 * | 4/2016 | Sendonaris | G01S 19/22 455/456.1 |
| 2020/0132858 A1 * | 4/2020 | Viswanathan | G01S 19/28 |
| 2021/0124057 A1 * | 4/2021 | Luo | G01S 19/22 |
| 2021/0124058 A1 * | 4/2021 | Nirula | G01S 19/22 |
| 2022/0397680 A1 * | 12/2022 | Lacaze | G01S 19/22 |

FOREIGN PATENT DOCUMENTS

| | | | |
|---|---|---|---|
| FR | 2906632 A1 * | 4/2008 | ............ G01S 19/28 |
| JP | 2017215285 A * | 12/2017 | |

OTHER PUBLICATIONS

K. Jamil, Solid Angle Computation with Monte Carlo Methods, Kindle Direct Publishing, p. 1-6 (Year: 2017).*
A. Michler et al., A V2X Based Data Dissemination Scheme for 3D Map Aided GNSS Positioning in Urban Environments, 2020 IEEE 23rd International Conference on Intelligent Transportation Systems (ITSC), 6 pages (Year: 2020).*

* cited by examiner

*Primary Examiner* — Vladimir Magloire
*Assistant Examiner* — Fred H Mull
(74) *Attorney, Agent, or Firm* — Lee & Hayes, P.C.

(57) ABSTRACT

A position of a vehicle can be determined based at least in part on positions of the satellites relative to the vehicle and elevations of objects proximate the vehicle. Satellite signals may be filtered or weighted using the elevation mask. For example, the techniques may include a computing device receiving map data, sensor data, and/or other input data, and determining a region within which a satellite has line of sight with the vehicle. Signals from satellites in the region having line of sight may be relied upon more heavily (or solely in some examples) in determining the vehicle position relative to signals from satellites outside of the region (e.g., no line of sight). Components of a vehicle computing device can receive an indication of whether or not a satellite includes line of sight to treat satellite signals differently when making determinations.

20 Claims, 5 Drawing Sheets

ELEVATION FILTERING OF SATELLITE SIGNALS

BACKGROUND

Global positioning and navigation satellite systems (GPS and GNSS) use satellites to locate an object in an environment. However, multipath signals (e.g., those that reflect off of surfaces before reaching an object) can introduce errors in location accuracy and/or increase an amount of time to locate an object versus location determinations that rely on signals from a satellite having a direct line of sight (e.g., attempting to reconcile inaccurate or inconsistent signals from multiple different satellites can cause a delay before determining a location). Further, errors in positioning caused by multipath signals can be used in downstream components thereby introducing inaccuracies in determinations from the components.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
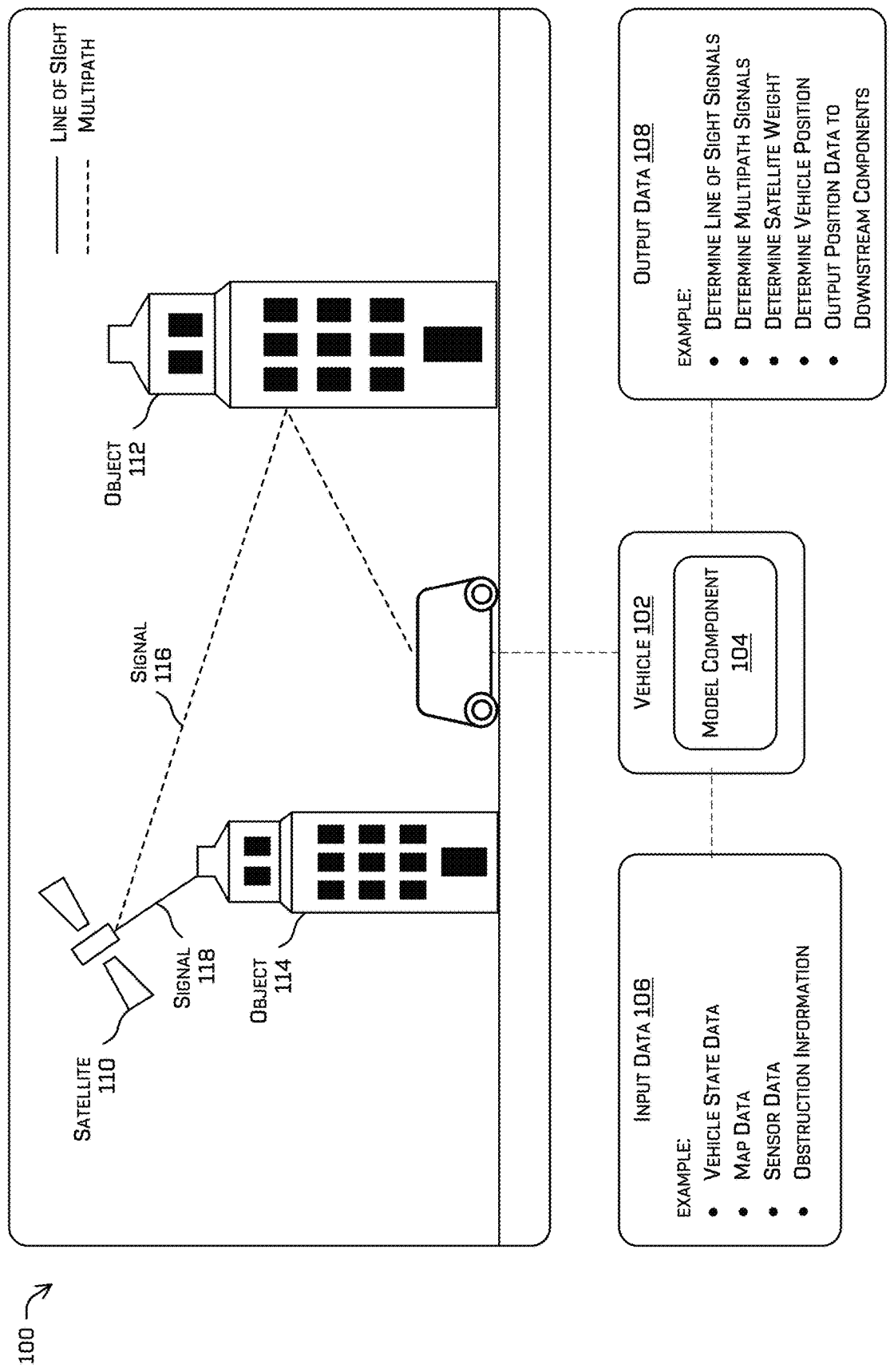
FIG. 1 is an illustration of an example environment, in which an example vehicle applies a model to predict line of sight with a satellite.

This application describes techniques for determining elevations of obstructions (e.g., buildings, trees, etc.) surrounding an autonomous vehicle, and using the elevations to identify satellites having a direct line of sight with the autonomous vehicle. A computing device can assign weights to position data based upon different satellites depending upon whether a respective satellite is capable of transmitting a signal to the autonomous vehicle using a single path. In some examples, the computing device can assign a weight to satellite data received from a satellite based on the satellite having a single path (direct line of sight) or a multiple path to the autonomous vehicle. For instance, the computing device can assign a first weight to first location determined using a first satellite with line of sight and a second weight to a second location determined using a second satellite not having line of sight, and determine a position of the autonomous vehicle based at least in part on the relative weights and locations (e.g., position determinations based on satellites not having line of sight to the vehicle can be reduced or eliminated based on the second weight). By using the positioning techniques as described herein, vehicle positions determinations can be determined with lower latency and with improved accuracy by mitigating the effects of multipath signals. Identifying data from satellite(s) with line of sight improves accuracy of position predictions while using fewer computational resources versus techniques that compute positions based on signals using multiple paths to reach the autonomous vehicle.

Using the techniques described herein can improve pose, localization, and/or position determinations by an autonomous vehicle which can also improve various downstream systems using such determinations as input. For example, a localization component, a perception component, and/or a planning component can use position data determined from particular satellites as input when determining a distance to an object, a trajectory for the autonomous vehicle, and so on. In some examples, the computing device can analyze elevations of objects in an environment surrounding the autonomous vehicle to generate an elevation mask of different objects (e.g., a three-dimensional mask of buildings, trees, another vehicle, etc.). The computing device can determine a region free of obstructions (and/or a solid angle associated with an unobstructed field of view to the sky) based on the elevation mask and classify signals received in the region as being from a satellite with line of sight to the autonomous vehicle (e.g., likely does not include a reflected path). The computing device can output a vehicle position depending upon whether a position of different satellites are inside or outside the region defined using the elevation mask, and/or a combination of signals based on weighting. The vehicle position can be used as input to other components of the computing device (e.g., perception components, motion planning components, safety systems, etc.) thereby improving downstream various determinations including the planning component determining a trajectory for the autonomous vehicle to safely avoid objects in the environment.

In various examples, data from one or more satellites can be used to control timing of an embedded system associated with the autonomous vehicle. For example, timing and/or frequency of the embedded system can be based at least in part on data from a line-of-sight satellite(s) and a weight assigned to the satellite and/or to different signals from the satellite. Using the techniques described herein enables a computing device to control timing of various systems associated with the autonomous vehicle by using determinations output by a model that processed different weighted satellite data as input. Weighted satellite data can also or instead be used to create a map to represent an environment (e.g., map data) and updating the map to include elevation information of obstructions, satellite information (e.g., position, line of sight status, signal strength, and so on), regions with line of sight for a given vehicle position, and the like. In various examples, such a map may vary temporally as a function of the orbit of the satellite.

Generally, the autonomous vehicle can implement a model to receive satellite data and filter which data to use in subsequent processing according to a weight or score indicating an importance (or accuracy or reliability) of first satellite data relative to second satellite data. In some examples, the model can predict which areas surrounding the autonomous vehicle are likely to receive line of sight data and which areas are likely to receive multipath data. In various examples, the line of sight data and the multipath data can be associated with a same satellite (e.g., a satellite can have a position that enables a transceiver of the satellite to transmit both a line of sight signal and a multipath signal) or different satellites.

By way of example and not limitation, a computing device can implement a model to detect obstructions surrounding an autonomous vehicle that can at least partially obstruct a satellite signal from reaching the autonomous vehicle. For instance, the model can receive sensor data (e.g., lidar data, camera data, etc.), map data, etc. as input and determine elevation information for buildings, mountains, plants, or other objects within a threshold distance of the autonomous vehicle. A same or different model can determine an area (or region) free of obstructions based at least in part on comparing the elevations of the obstructions with known positions of the satellites. For example, satellites within bounds of the area are able to transmit a line of sight signal toward the area while a satellite positioned outside the area that detects the autonomous vehicle can be considered a multipath signal (also referred to as "multiple path" for including a path that originates at a reflective surface before reaching the autonomous vehicle). Signals received from satellites positioned within bounds of the area can be assigned a higher weight than a weight assigned to a signal received from a satellite positioned outside the bounds of the area, for example. Weighted signal data can be used as input to a model that is configured to determine a current position of the autonomous vehicle, for example.

In some examples, the model can further determine a weight for signal data from a particular satellite based on historical map data associated with a position in the environment and/or a time. The historical map data can represent known obstructions caused by objects, elevations of the obstructions, reflective surfaces (e.g., building windows that reflect at different times of the day, seasons, etc.), or other information about the objects, the autonomous vehicle, the environment, and so on. The model can determine a weight for a signal representing line of sight between a satellite and the autonomous vehicle with consideration to static obstructions that persist over time, such as a building or a tree. The model can identify satellites that do not have line of sight and assign a lower weight (e.g., a weight that reduces or eliminates data from such satellites) in subsequent position predictions. The satellite does not require any special logic or functionality in order for the autonomous vehicle to detect that a position determination is based on a multipath signal and therefore unknowingly introduce errors in accuracy or delays in processing (due to the longer paths used by the signal to reach the autonomous vehicle). Using the techniques described herein, the autonomous vehicle can determine satellites that use multipath data and position information from such satellites can be down-weighted, reduced or eliminated in subsequent position processing by a computing device of the autonomous vehicle.

In some examples, a model can receive lidar data for determining an elevation mask representing obstructions surrounding a vehicle such as building, trees, etc. The elevation mask can represent peak elevations for objects up to 360 degrees around the autonomous vehicle. The model can compare positions of satellites to the elevation mask to identify whether a signal from a satellite has either a single path (direct line of sight) to the vehicle or multiple paths to the vehicle (the signal reflected off a surface in the environment to reach the vehicle). By identifying which satellites have the line of sight using an elevation mask, the vehicle can prioritize data from such satellites over position data from a satellite associated with a GPS and/or a GNSS which may be susceptible to using multipath signal data when determining locations (e.g., without explicitly knowing multipath signal data is used due to a signal strength of the reflected signal being above a signal strength threshold). Alternatively, or additionally, various third party data sources may be used that comprise the elevation of buildings or natural geologic features including, but not limited to, Google Elevation, Open Elevation, NOAA altimetry data, and the like.

In various examples, a model component (also referred to as "a model" herein) can receive, as input data, one or more of: satellite data (e.g., an orbit, position, time, etc.), map data, sensor data, position data, orientation data, heading data, velocity data, speed data, acceleration data, yaw rate data, or turning rate data associated with a vehicle. The model component may be configured to determine an elevation of each object in an environment (e.g., a physical area in which the vehicle operates and/or a simulated environment) indicated by the input data. In some examples, the elevations can be represented by 3D coordinates (polar or rectilinear), a ray represented by an elevation angle and an azimuth angle, a height map, etc. The elevation(s) can be used to determine a line of sight relative to an origin at the autonomous vehicle (e.g., a portion of the vehicle). Lines between the origin of the vehicle and each of the various elevations can define bounds of an area representing an unobstructed space for a satellite signal to reach the autonomous vehicle (e.g., a solid angle). Signals received from satellites within bounds of the unobstructed space can be used to determine future vehicle positions independent of (at the exclusion of) position data received from satellites outside bounds of the unobstructed space (and therefore more likely to rely on a multipath signal to determine a position of the vehicle). In some examples, such as when fewer than a threshold number of satellites are within the bounds of the unobstructed space, position data received from satellites outside bounds of the unobstructed space may still be taken into account but may be down-weighted and/or may be subject to further processing.

In some examples, a model can implement the techniques described herein while an autonomous vehicle navigates an environment. In various examples, the model can determine elevation data for objects surroundings the autonomous vehicle and use the elevation data to identify line of sight satellites. For instance, the model can determine the elevation data while the autonomous vehicle navigates in an environment with a threshold number of objects (e.g., a dense urban environment that meets or exceeds an object threshold), a threshold number of reflective surfaces (e.g., windows, building, trucks, buses, etc.), a loss of satellite signal from a previous time, and so on. The positioning techniques described herein can also or instead be implemented responsive to detecting object(s) above a height threshold capable of reflecting or blocking satellite signals (e.g., above 10 meters) and/or proximity of the objects to the vehicle (e.g., within 10 meters of the vehicle). Given satellites relatively long distance from an entity being located, line of sight can change by time of day, time of year, etc., and even relatively short "urban canyons" such as a vehicle between a building, a tree, a bus, a truck, and/or another object can affect the precision of a satellite determination. Using the model as described herein enables the autonomous vehicle to determine vehicle positions including when fixed or dynamic objects block satellite signals.

As mentioned, the computing device can generate a map of an environment surrounding the autonomous vehicle based on data from satellites having line of sight to different vehicle positions. For example, map data can represent peak elevations of objects above a height threshold (e.g., buildings over a minimum height, a truck adjacent to the vehicle blocking a percentage of a field of view) and can also represent line of sight information (whether or not a satellite has line of sight). The map data associated with the map can be available to the autonomous vehicle, or different vehicle in a fleet of vehicles, for determining which available satellites are useful at various positions in the future. Further, the map data can be input into a model that determines elevation data, weights, an area free of obstructions, or other output.

As described herein, models may be representative of machine learned models, statistical models, heuristic models, equations, algorithmic representations, maps, or a combination thereof. That is, a model may refer to a machine learning model that learns from a training data set to improve accuracy of an output (e.g., a prediction). Additionally or alternatively, a model may refer to a statistical model that is representative of logic and/or mathematical functions that generate approximations which are usable to make predictions.

The techniques discussed herein may improve functioning of a vehicle computing system in a number of ways. The vehicle computing system may determine a position for the autonomous vehicle based on satellite data having a line of sight with the autonomous vehicle. In some examples, using the positioning techniques described herein, a model may output a receiving area for signals to have line of sight based the elevation information representing object obstructions, and prioritize signals received from within the receiving area in future processing to save computational resources and improve accuracy.

The techniques discussed herein can also improve the functioning of a computing device in a number of additional ways. In some cases, multipath satellite data can be identified and subsequently reduced or eliminated in future position determinations thereby allowing an autonomous vehicle to generate more accurate initial positions which can lead to safer trajectory determinations for the autonomous vehicle to traverse an environment. In at least some examples described herein, predictions based on data from line of sight satellites account for obstructions in an environment, yielding safer decision-making of the system. These and other improvements to the functioning of the computing device are discussed herein.

The methods, apparatuses, and systems described herein can be implemented in a number of ways. Example implementations are provided below with reference to the following figures. Although discussed in the context of an autonomous vehicle in some examples below, the methods, apparatuses, and systems described herein can be applied to a variety of systems. In one example, machine learned models may be utilized in driver-controlled vehicles in which such a system may provide an indication of whether it is safe to perform various maneuvers. In another example, the methods, apparatuses, and systems can be utilized in an aviation, nautical, manufacturing, agricultural, etc. context. Additionally, or alternatively, the techniques described herein can be used with real data (e.g., captured using sensor(s)), simulated data (e.g., generated by a simulator), or any combination thereof.

FIG. 1 illustrates an autonomous vehicle (vehicle 102) in an example environment 100, in which an example model component 104 may process input data 106 to predict line of sight with a satellite. As illustrated, the vehicle 102 includes the model component 104 that represents one or more statistical, heuristic, and/or machine learned models for processing various types of input data (e.g., feature vectors, top-down representation data, sensor data, map data, etc.) associated with the one or more objects in the environment 100, and determines output data 108 indicating whether a satellite is associated with a line of sight signal or a multipath signal and optionally further assigning a weight to a satellite and/or determining a vehicle position. In some examples, the prediction techniques described herein may be implemented at least partially by or in association with a vehicle computing device (e.g., vehicle computing device 404) and/or a remote computing device (e.g., computing device(s) 450).

In some instances, the vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 102 may be a fully or partially autonomous vehicle having any other level or classification. In some examples, the vehicle 102 can be a bi-directional vehicle.

In various examples, a vehicle computing device may be configured to control operation of the vehicle including detecting one or more objects (e.g., object 112 and object 114) in the environment 100. In some examples, the vehicle computing device may detect the objects, based on sensor data received from one or more sensors. In some examples, the sensors may include sensors mounted on the vehicle 102, and include, without limitation, ultrasonic sensors, radar sensors, light detection and ranging (lidar) sensors, cameras, microphones, inertial sensors (e.g., inertial measurement units, accelerometers, gyros, etc.), global positioning system (GPS) sensors, and the like. In various examples, the vehicle 102 may be configured to transmit and/or receive data from other autonomous vehicles and/or the sensors. The data may include sensor data, such as data regarding the objects detected in the environment 100.

In various examples, the vehicle computing device can receive the sensor data and can semantically classify the detected objects (e.g., determine an object type), such as, for example, whether the object is a vehicle, a pedestrian, a building such as the object 112 and the object 114, a truck, a motorcycle, a moped, or the like. The objects may include static objects (e.g., buildings, bridges, signs, etc.) and dynamic objects such as other vehicles, pedestrians, bicyclists, or the like. In some examples, a classification may include another vehicle (e.g., a car, a pick-up truck, a semi-trailer truck, a tractor, a bus, a train, etc.), a pedestrian, a child, a bicyclist, a skateboarder, an equestrian, an animal, or the like. In various examples, the classification of the object may be used by a model to determine object characteristics (e.g., maximum speed, acceleration, maneuverability, etc.). In this way, potential trajectories by an object may be considered based on characteristics of the object (e.g., how the object may potentially move in the environment).

Generally, the model component 104 provides functionality to determine a position for the vehicle 102 at various times as the vehicle navigates in the environment 100 (e.g., a simulated environment and/or a real-world environment). FIG. 1 depicts the environment 100 including a satellite 110, the object 112 (e.g., a first building), the object 114 (e.g., a second building), though other satellites and/or objects may be included in other examples. The satellite 110 can transmit a signal 116 representing a multipath signal (e.g., reflects off at least one surface) to locate the vehicle 102, and a signal 118 representing a line of sight (direct path) to the vehicle 102 which is blocked by the object 114 in FIG. 1.

The model component 104 can determine elevations of the object 112 and the object 114 and determine an area substantially above a planar surface of the vehicle capable of receiving a line of sight signal from available satellites (e.g., satellites of a GPS and/or GNSS system). A region between the vehicle 102 and peak elevations of the objects can form boundaries that define an unobstructed region for receiving the line of sight signal (e.g., a solid angle). The model component 104 can detect various obstructions in a vicinity of the vehicle 102 and generate elevation information that models peak elevations of objects surrounding the vehicle 102 (e.g., 360 degrees).

In some examples, the model component 104 can represent one or more machine learned models that are trained to generate an elevation mask indicating peak elevations of various objects. The model component 104 can determine the output data 108 based at least in part on applying a masking algorithm to the input data 106. For example, as described in more detail elsewhere herein, sensor data from one or more sensors can be used to determine an elevation of the object 114, and based on the elevation, the model component 104 can determine that the signal 118 is unable to reach the vehicle 102 using line of sight. The model component 104 can assign a weight to the signal data associated with the signal 116 indicating a multipath was used to locate the vehicle 102. The weight assigned to the signal 116 can cause the data associated with the signal 116 to be reduced or eliminated in future determinations by the vehicle computing device which can rely instead on data from a line of sight satellite, if available.

The output data 108 from the model component 104 can be used by the vehicle computing device in a variety of ways. For instance, information about vehicle positioning can be used as "input data, or reference data for processing by a planning component of the vehicle computing device to control the vehicle 102 in the environment 100 (e.g., determine a trajectory and/or control a propulsion system, a braking system, or a steering system). The output data 108 may also or instead be used to perform a simulation by setting up conditions (e.g., an intersection, a number of objects, a likelihood for the object to exhibit abnormal behavior, etc.) for use during the simulation such as to test a response by a vehicle safety system.

A training component of a remote computing device, such as the computing device(s) 450 (not shown) and/or the vehicle computing device 404 (not shown) may be implemented to train the model component 104. Training data may include a wide variety of data, such as image data, video data, lidar data, radar data, audio data, other sensor data, etc., that is associated with a value (e.g., a desired classification, inference, prediction, etc.). In some examples training data can comprise determinations based on sensor data, such as line of sight regions, bounding boxes (e.g., two-dimensional and/or three-dimensional bounding boxes associated with an object), segmentation information, classification information, an object trajectory, and the like. Such training data may generally be referred to as a "ground truth." To illustrate, the training data may be used for image classification and, as such, may include an image of an environment that is captured by an autonomous vehicle and that is associated with one or more classifications. In some examples, such a classification may be based on user input (e.g., user input indicating that the image depicts a specific type of object) or may be based on the output of another machine learned model. In some examples, such labeled classifications (or more generally, the labeled output associated with training data) may be referred to as ground truth. Training the model component 104 can improve vehicle position determinations over time by learning how to determine areas for receiving line of sight signals.

Figure 2:
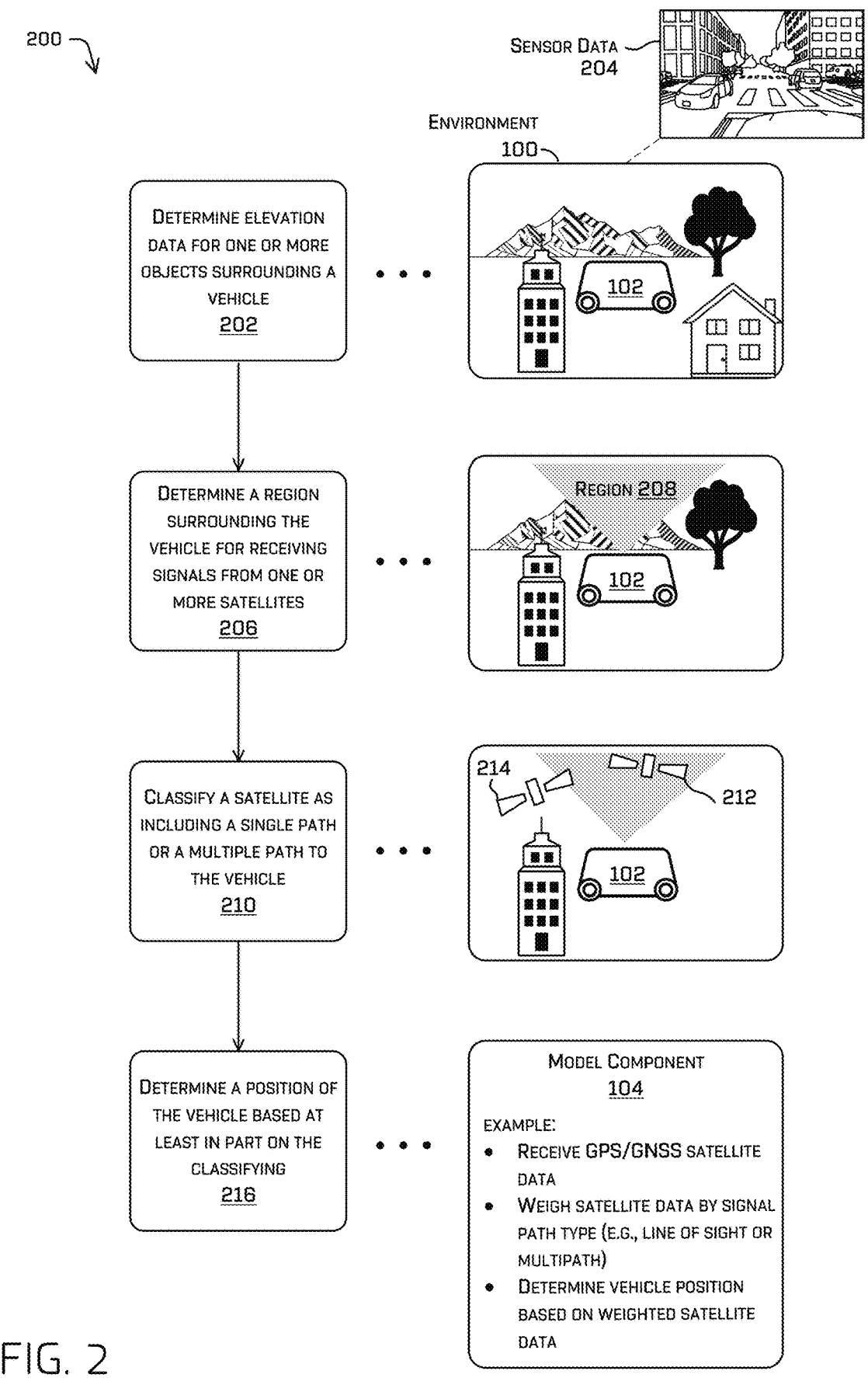
FIG. 2 is a pictorial flow diagram of an example process for determining a position of a vehicle based on elevation information output from a model.

FIG. 2 is a pictorial flow diagram of an example process 200 for determining a position of a vehicle (e.g., vehicle 102 or vehicle 402) based on elevation information output from a model. The example process 200 may be implemented by a computing device such as the vehicle computing device 404 and/or the vehicle safety system 434 of FIG. 4. In some examples, the techniques described in relation to FIG. 2 can be performed as the vehicle 102 navigates in the environment 100.

An operation 202 can include determining elevation data for one or more objects surrounding a vehicle. In some examples, determining elevation data can include a model (e.g., the model component 104) determining a peak elevation of one or more of: a building, a house, a glass surface, a mountain, a bus, a truck, a trailer, a sign, a tunnel, a bridge, or a plant that can potentially block a satellite signal. In various examples, the elevation data can indicate a maximum height of a respective object to a nearest edge or boundary of a body of the vehicle. The elevation data may be based at least in part on sensor data 204 from one or more sensors associated with the vehicle. The sensor data 204 as shown represents an example partial view from one or more sensors of the vehicle 102. The sensor data 204 can represent theoretical sensor data (simulation data) and/or real-time sensor data (data received from a sensor at a current time). In various examples, the model can apply one or more algorithms to lidar data and other input data to generate an elevation mask representing maximum object heights relative to a surface of the vehicle (e.g., a top planar surface). The lidar data can be associated with one or more lidar sensors coupled to the vehicle including a lidar sensor having an angle of elevation substantially above the top planar surface of the vehicle. In some examples, the elevation mask can be based at least in part on object heights represented in a voxel space. Additional examples of representing an environment using a voxel space can be found, for example, in U.S. patent application Ser. No. 16/420,090 titled "Multiresolution Voxel Space" and filed May 22, 2019, the entirety of which is herein incorporated by reference in its entirety and for all purposes.

An operation 206 can include determining a region surrounding the vehicle for receiving signals from one or more satellites. For example, the operation 206 can include the vehicle 102 implementing the model component 104 to determine a region 208 defined by connecting peak elevations points one to another. In various examples, the region 208 can be determined at different times in the future. In some examples, the region 208 can vary in shape such as a cone with the vehicle at the origin and the sides of the cone corresponding to a peak elevation of different objects. Of course, the shape of the area can vary based on a position of the vehicle and the number of object elevations as further described elsewhere herein including in FIG. 3.

An operation 210 can include classifying a satellite as including a single path or a multiple path to the vehicle. For example, the operation 210 can include the vehicle 102 implementing the model component 104 to classify a satellite 212 as including a single path (direct line) to the vehicle 102 based on a position of the satellite 212 being within the region 208. The model component 104 may also or instead classify a satellite 214 as not including a single path to the vehicle 102 based on a position of the satellite 214 being outside the region 208. The line of sight for the satellite 214 is lost based on an elevation of a building or other obstruction used to define the region 208. That is, a transceiver of the satellite 214 is substantially located in a center of the satellite 214 and thus outputs a signal toward the building.

In some examples, the operation 210 can be based at least in part on receiving one or more satellite signals for multiple satellites. For example, a satellite signal can indicate an identifier of the satellite, time information, a satellite position, and the like. The model component 104 can determine, for example, an orbital position of each satellite based on the orbit and timing information associated with the satellite signal. The single path or multiple path classification of the satellite can be based on a current orbital position of the satellite relative to the region 208. In some examples, a line from an origin of a sensor of the vehicle (e.g., a GNSS sensor coupled to the vehicle) to the orbital position of the satellite can be used to determine whether a future signal from the satellite is within bounds of the region 208.

An operation 216 can include determining a position of the vehicle based at least in part on the classifying. For example, the operation 216 can include the vehicle 102 implementing the model component 104 to determine a position of the vehicle 102 that serves as reference position data for other components and/or systems of the vehicle 102. In various examples, the position can include coordinates relative to a coordinate system. The model component 104 may, for instance, determine a higher weight for satellite data having line of sight as indicated by the classification (e.g., the satellite 212) versus a weight assigned to satellite data not having line of sight (and possibly having a multipath to the vehicle 102), and further determine the position of the vehicle based at least in part on the weighted satellite data.

Figure 3:
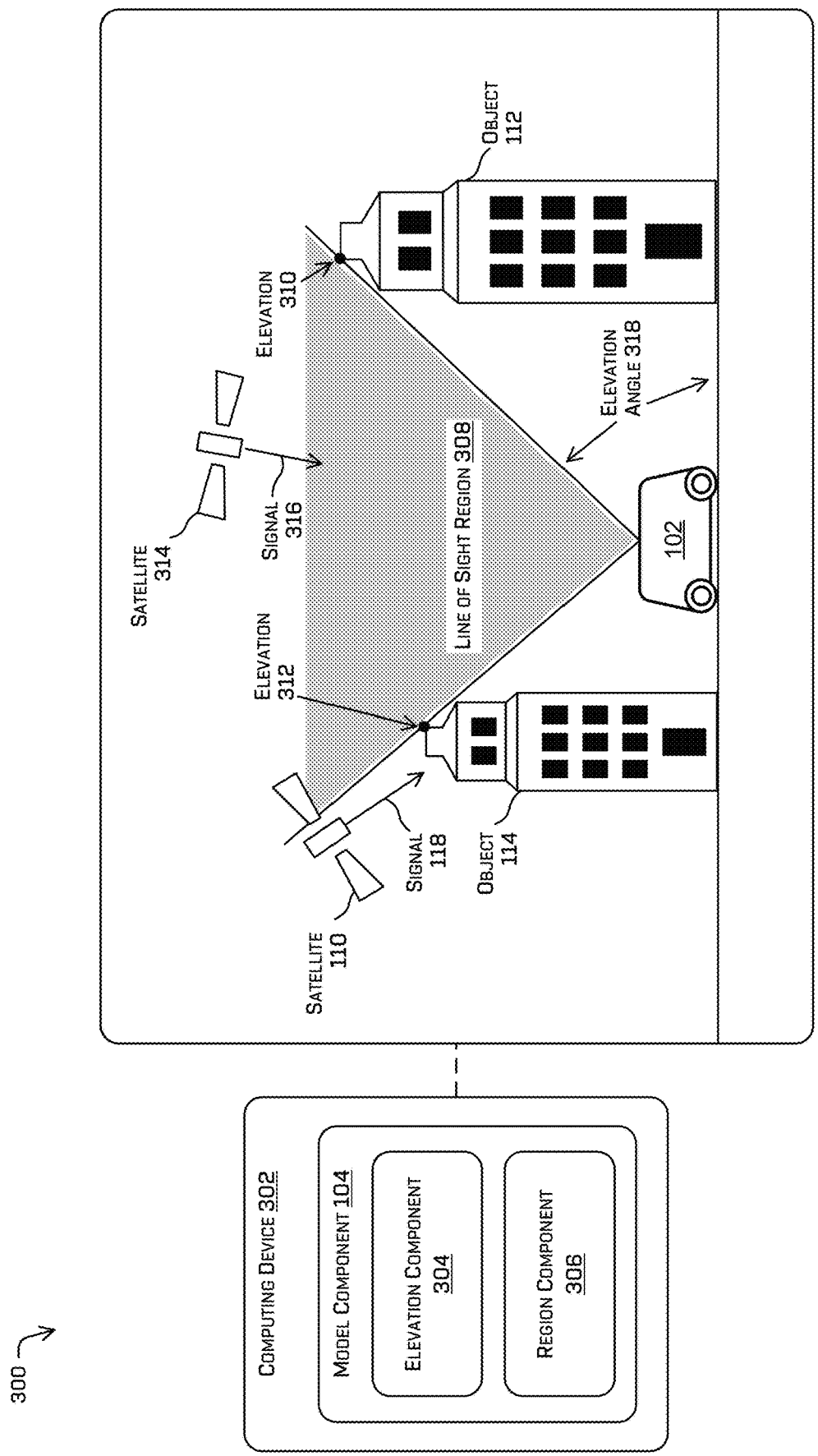
FIG. 3 illustrates an example environment, in which an example vehicle applies a model to determine a line of sight region surrounding the vehicle.

FIG. 3 illustrates an example environment 300, in which an example vehicle (vehicle 102 of FIG. 1) applies a model to determine a line of sight region surrounding the vehicle. The environment 300 includes a computing device 302 (e.g., the vehicle computing device(s) 404 and/or the computing device(s) 450) comprising the model component 104 of FIG. 1. In some examples, the techniques described in relation to FIG. 3 can be performed as the vehicle 102 navigates in the environment 300.

FIG. 3 shows the model component 104 comprising an elevation component 304 and a region component 306. The elevation component 304 can be configured to identify, generate, or otherwise determine elevation data (e.g., an elevation mask, elevation data, a peak elevation, a maximum elevation, or other elevation information) associated with an object within a threshold distance of the vehicle 102. In some examples, the elevation component 304 can determine the elevation data for objects above a threshold height as a function of distance from the vehicle.

The region component 306 can be configured to determine a line of sight region 308 representing an area from which the vehicle 102 can receive signals directly from one or more available satellites. The line of sight region 308 can include an origin at a point of the vehicle 102 (e.g., a portion of a vehicle body, a sensor located at a center, corner, or edge of the vehicle, etc.) and bounds defined by an elevation 310 of the object 112 and an elevation 312 of the object 114. The elevation 310 and/or the elevation 312 can represent a peak elevation relative to an origin at the vehicle 102 (e.g., a top center as shown though any surface of the vehicle may be used as an origin in other examples). The line of sight region 308 can represent a three-dimensional shape formed by lines at the origin of the vehicle to different elevations such that each additional elevation associated with an obstruction causes a change in shape of the line of sight region 308.

The elevation component 304 and/or the region component 306 can receive, as input data, sensor data from one or more sensors, third-party data (e.g., sensor data, map data, elevation data, etc.), map data, historical data, or a combination thereof. In some examples, the sensor data can be received from two or more sensors having different modalities. The input data can also or instead include elevation data from a third party application for the elevation component 304 to determine the elevation data for different objects and/or for the region component 306 to determine the line of sight region 308. In various examples, functionality associated with the elevation component 304 can be incorporated into the region component 306, and vice versa. In at least some examples, localization may be performed independent of GNSS (or using multipath GNSS) such as, for example, performing lidar localization. In such examples, the position of the vehicle in the world may subsequently be used to determine one or more of the map data, historical data, third party data, positions of the satellites, etc.

In some examples, the region component 306 can determine the line of sight region 308 based at least in part on lidar data captured by one or more lidar sensors using outputting lidar beams at a range of elevation angles. For instance, lidar data captured at up to a maximum elevation angle available to a respective lidar sensor can emit beams at angles that capture heights of buildings, trees, or other potential obstacles for satellite signals. In various examples, the maximum elevation angle for beams output by a lidar sensor can be used to form an elevation mask representing elevations of obstacles at a range of angles. The maximum elevation angle of a lidar sensor can include the maximum elevation angle associated with a valid return to the lidar sensor. Determining the line of sight region 308 can include, for example, defining boundaries using respective elevation data in which a first boundary can be a line from the origin at the vehicle to a first elevation, a second boundary can be another line from the origin at the vehicle to a second elevation and so on for each elevation. In other examples, the region component 306 can determine the line of sight region 308 based at least in part on theoretical data (independent of sensor data, for example).

In various examples, the region component 306 can determine how to process lidar data from different available lidar sensors associated with the vehicle 102. For example, lidar sensors located at different portions of the vehicle enable the vehicle 102 to capture an environment surrounding of the vehicle 102. In some examples, a first lidar sensor can include a wider range of available beam angles than a second lidar sensor (due to its position, obstructions, etc.), and the region component 306 can determine whether to generate an elevation mask using data from a particular sensor(s). Lidar sensors coupled to the vehicle 102 may have different field of views and a lidar sensor having a wider field of view relative to another lidar sensor may be assigned a higher weight. In this way, the region component 306 can assign weights to data from different lidar sensors to improve determinations (elevation data, peak elevation, etc.).

As shown in FIG. 3, the satellite 314 can transmit a signal 316 using a transceiver located substantially at the center of the satellite. The signal 316 is a line of sight signal because it is received in the line of sight region 308 whereas the satellite 110 transmits the signal 118 is obstructed by the object 114 and therefore not in the line of sight region 308 (e.g., does not have line of sight). In various examples, the model component 104 can determine computational resources to apply when processing data from the satellite 110 and/or the satellite 314 based at least in part on a position of the respective satellite being inside or outside of the line of sight region 308 to the vehicle.

In some examples, the line of sight region 308 can be based at least in part on an elevation angle 318 representing an elevation angle for an object relative to a ground surface (or surface associated with the vehicle). For instance, the elevation mask can include elevation angles for multiple objects in the environment. In some examples, the elevations can be represented by 3D coordinates (polar or rectilinear) and/or a ray represented by an elevation angle and an azimuth angle.

In some examples, the model component 104 can select a satellite for receiving data usable to determine a position of the vehicle 102. The satellite 110 may provide data to the model component 104 without indicating whether the data is associated with a multipath signal. The satellite 110 may detect the vehicle using a multipath signal (e.g., a reflection off an object such as the object 112). The model component 104 can select, for example, data from the satellite 314 given its position relative to the line of sight region 308. Thus, the model component 104 can prevent processing of data from the satellite 110 to avoid relying on multipath signals, even when the satellite 110 is unaware that the data it captured is based on a multipath signal.

In some examples, the model component 104 can implement various positioning techniques including but not limited to Real Time Kinematics (RTK), Precision Point Positioning (PPP), among others. For example, the model component 104 can determine a position of an autonomous vehicle using RTK based at least in part on input data associated with satellites having line of sight (e.g., instead of satellite data from satellites having a multipath signal to the autonomous vehicle).

In various examples, the model component 104 can implement the elevation component 304 and/or the region component 306 to generate the line of sight region 308 based on elevations of obstructions in addition to the elevation 310 and the elevation 312. For example, the vehicle 102 can be proximate to another vehicle (e.g., a bus, a truck, etc.) that can temporarily block a satellite signal depending upon a distance to the other vehicle, a height of the other vehicle, and so on. In such examples, the model component 104 can account for the other vehicle potentially blocking signals, and subsequent positions of the vehicle 102 can be determined with consideration to temporary obstructions.

Though FIG. 3 depicts two satellites, in some examples, vehicle position determinations can be based at least in part on receiving signals associated with satellites having only multiple paths to a surface of the vehicle. For example, in examples when no line of sight signals are available, the model component 104 can generate an output using one or more multipath signals.

Figure 4:
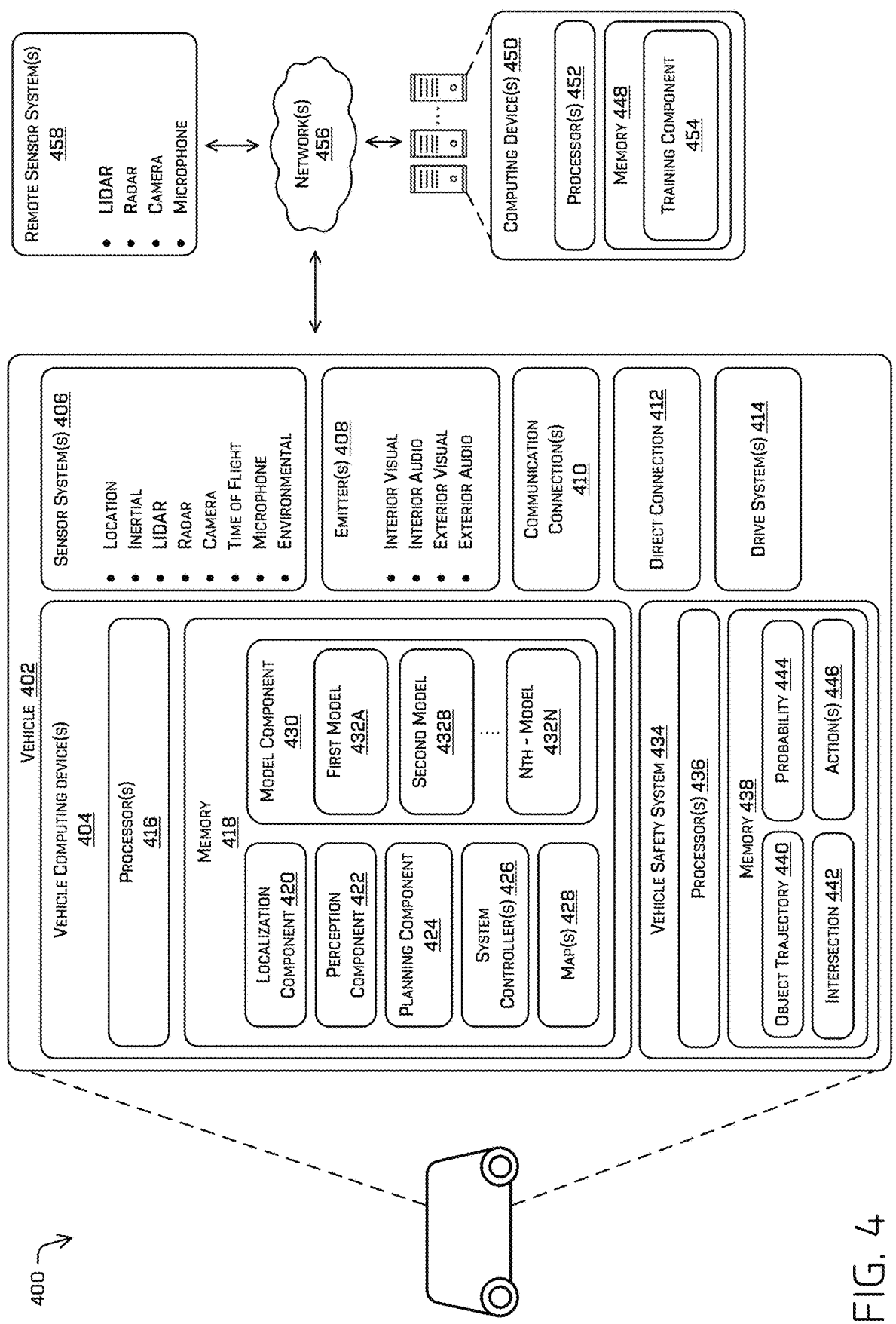
FIG. 4 is a block diagram of an example system for implementing the techniques described herein.

FIG. 4 is a block diagram of an example system 400 for implementing the techniques described herein. In at least one example, the system 400 may include a vehicle, such as vehicle 402.

The vehicle 402 may include a vehicle computing device 404 (also referred to as a vehicle computing device 404 or vehicle computing device(s) 404), one or more sensor systems 406, one or more emitters 408, one or more communication connections 410, at least one direct connection 412, and one or more drive systems 414.

The vehicle computing device(s) 404 may include one or more processors 416 and memory 418 communicatively coupled with the one or more processors 416. In the illustrated example, the vehicle 402 is an autonomous vehicle; however, the vehicle 402 could be any other type of vehicle, such as a semi-autonomous vehicle, or any other system having at least an image capture device (e.g., a camera enabled smartphone). In the illustrated example, the memory 418 of the vehicle computing device 404 stores a localization component 420, a perception component 422, a planning component 424, one or more system controllers 426, one or more maps 428, and a model component 430 including one or more models, such as a first model 432A, a second model 432B, up to an Nth model 432N (collectively "models 432"), where N can be any integer greater than 1. Though depicted in FIG. 4 as residing in the memory 418 for illustrative purposes, it is contemplated that the localization component 420, the perception component 422, the planning component 424, the one or more system controllers 426, the one or more maps 428, and/or the model component 430 including the models 432 may additionally, or alternatively, be accessible to the vehicle 402 (e.g., stored on, or otherwise accessible by, memory remote from the vehicle 402, such as, for example, on memory 448 of a remote computing device 450).

Additionally, vehicle 402 may include a vehicle safety system 434, including an object trajectory component 440, an intersection component 442, a probability component 444, and an action component 446. As shown in this example, the vehicle safety system 434 may be implemented separately from the vehicle computing device(s) 404, for example, for improved performance of the vehicle safety system, and/or to provide redundancy, error checking, and/or validation of determinations and/or commands determined by the vehicle computing device(s) 404. However, in other examples, the vehicle safety system 434 may be implemented as one or more components within the same vehicle computing device(s) 404.

By way of example, the vehicle computing device(s) 404 may be considered to be a primary system, while the vehicle safety system 434 may be considered to be a secondary system. The primary system may generally perform processing to control how the vehicle maneuvers within an environment. The primary system may implement various artificial intelligence (AI) techniques, such as machine learning, to understand an environment around the vehicle 402 and/or instruct the vehicle 402 to move within the environment. For example, the primary system may implement the AI techniques to localize the vehicle, detect objects around the vehicle, segment sensor data, determine classifications of the objects, predict object tracks, generate trajectories for the vehicle 402 and the objects around the vehicle, and so on. In some examples, the primary system may process data from multiple types of sensors on the vehicle, such as light detection and ranging (lidar) sensors, radar sensors, image sensors, depth sensors (time of flight, structured light, etc.), cameras, and the like, within the sensor systems 406.

In some examples, the vehicle safety system 434 may operate as separate system that receives state data (e.g., perception data) based on the sensor data and AI techniques implemented by the primary system (e.g., vehicle computing device(s) 404), and may perform various techniques described herein for improving collision prediction and avoidance by the vehicle 402. As described herein, the vehicle safety system 434 may implement techniques for predicting intersections/collisions based on sensor data, as well as probabilistic techniques that are based on positioning, velocity, acceleration, etc. of the vehicle and/or objects around the vehicle. In some examples, the vehicle safety system 434 may process data from sensors, such as a subset of sensor data that is processed by the primary system. To illustrate, the primary system may process lidar data, radar data, image data, depth data, etc., while the vehicle safety system 434 may process just lidar data and/or radar data (and/or time of flight data). In other examples, however, the vehicle safety system 434 may process sensor data from any number of sensors, such as data from each of the sensors, data from the same number of sensors as the primary system, etc.

Additional examples of a vehicle architecture comprising a primary computing system and a secondary computing system can be found, for example, in U.S. patent application Ser. No. 16/189,726 titled "Perception Collision Avoidance" and filed Nov. 13, 2018, the entirety of which is herein incorporated by reference in its entirety and for all purposes.

Although depicted in FIG. 4 as residing in the memory 418 for illustrative purposes, it is contemplated that the localization component 420, the perception component 422, the planning component 424, the model component 430, the system controllers 426, and the maps 428 may additionally, or alternatively, be accessible to the vehicle 402 (e.g., stored on, or otherwise accessible by, memory remote from the vehicle 402, such as, for example, on memory 448 of a remote computing device 450). Similarly, the object trajectory component 440, intersection component 442, probability component 444, and/or action component 446 are depicted as residing in the memory 438 of the vehicle safety system 434, one or more of these components may additionally, or alternatively, be implemented within vehicle computing device(s) 404 or may be accessible to the vehicle 402 (e.g., stored on, or otherwise accessible by, memory remote from the vehicle 402, such as, for example, on memory 448 of a remote computing device 450).

In at least one example, the localization component 420 may include functionality to receive data from the sensor system(s) 406 to determine a position and/or orientation of the vehicle 402 (e.g., one or more of an x-, y-, z-position, roll, pitch, or yaw). For example, the localization component 420 may include and/or request/receive a map of an environment, such as from map(s) 428, and may continuously determine a location and/or orientation of the autonomous vehicle within the map. In some instances, the localization component 420 may utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 420 may provide data to various components of the vehicle 402 to determine an initial position of an autonomous vehicle for determining the relevance of an object to the vehicle 402, as discussed herein.

In some instances, the perception component 422 may include functionality to perform object detection, segmentation, and/or classification. In some examples, the perception component 422 may provide processed sensor data that indicates a presence of an object (e.g., entity) that is proximate to the vehicle 402 and/or a classification of the object as an object type (e.g., car, pedestrian, cyclist, animal, building, tree, road surface, curb, sidewalk, unknown, etc.). In some examples, the perception component 422 may provide processed sensor data that indicates a presence of a stationary entity that is proximate to the vehicle 402 and/or a classification of the stationary entity as a type (e.g., building, tree, road surface, curb, sidewalk, unknown, etc.). In additional or alternative examples, the perception component 422 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

In general, the planning component 424 may determine a path for the vehicle 402 to follow to traverse through an environment. For example, the planning component 424 may determine various routes and trajectories and various levels of detail. For example, the planning component 424 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 424 may generate an instruction for guiding the autonomous vehicle along at least a portion of the route from the first location to the second location. In at least one example, the planning component 424 may determine how to guide the autonomous vehicle from a first waypoint in the sequence of waypoints to a second waypoint in the sequence of waypoints. In some examples, the instruction may be a trajectory, or a portion of a trajectory. In some examples, multiple trajectories may be substantially simultaneously generated (e.g., within technical tolerances) in accordance with a receding horizon technique, wherein one of the multiple trajectories is selected for the vehicle 402 to navigate.

In some examples, the planning component 424 can implement one or more tree search algorithms to determine the path for the vehicle 402. For instance, the planning component 424 can implement the model component 430 (having at least the functionality of the model component 104 of FIG. 1) to apply a tree search algorithm to a decision tree to determine a vehicle trajectory for the vehicle 402. In some examples, the vehicle computing device(s) 404 can exchange data with the computing device(s) 450 including sending log data associated with the tree search algorithm to the computing device(s) 450 and receiving updated or optimized algorithms from the computing device(s) 450.

In some examples, the planning component 424 may include a prediction component to generate predicted trajectories of objects (e.g., dynamic objects such as pedestrians, cars, trucks, bicyclists, animals, etc.) in an environment. For example, a prediction component may generate one or more predicted trajectories for objects within a threshold distance from the vehicle 402. In some examples, the planning component 424 can include or otherwise perform the functionality associated with the elevation component 304 and/or the region component 306 and/or can receive input from the elevation component 304 and/or the region component 306.

In at least one example, the vehicle computing device 404 may include one or more system controllers 426, which may be configured to control steering, propulsion, braking, safety, emitters, communication, and other systems of the vehicle 402. The system controller(s) 426 may communicate with and/or control corresponding systems of the drive system(s) 414 and/or other components of the vehicle 402.

The memory 418 may further include one or more maps 428 that may be used by the vehicle 402 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 402 may be controlled based at least in part on the map(s) 428. That is, the map(s) 428 may be used in connection with the localization component 420, the perception component 422, and/or the planning component 424 to determine a location of the vehicle 402, detect or determine gravity, detect objects in an environment, generate routes, determine actions and/or trajectories to navigate within an environment.

In some examples, the one or more maps 428 may be stored on a remote computing device(s) (such as the computing device(s) 450) accessible via network(s) 456. In some examples, multiple maps 428 may be stored based on, for example, a characteristic (e.g., type of entity, time of day, day of week, season of the year, etc.). Storing multiple maps 428 may have similar memory requirements, but increase the speed at which data in a map may be accessed.

As illustrated in FIG. 4, the vehicle computing device 404 may include a model component 430. The model component 430 may be configured to determine line of sight for satellites that provide data to the vehicle computing device (s) 404. For instance, the model component 430 (or other component) can determine elevation information associated with obstructions in an environment of the vehicle 402. For instance, the model component 430 can determine the output data 108 of FIG. 1 and provide at least the functionality of the model component 104, the elevation component 304, and the region component 306. In various examples, the model component 430 may receive sensor data associated with an object from the localization component 420, the perception component 422, and/or from the sensor system(s) 406. In some examples, the model component 430 may receive map data from the localization component 420, the perception component 422, the maps 428, and/or the sensor system(s) 406. While shown separately in FIG. 4, the model component 430 could be part of the localization component 420, the perception component 422, the planning component 424, or other component(s) of the vehicle 402. For instance, functionality of the model component 430 can be included in the localization component 420.

In various examples, the model component 430 may send output(s) from the first model 432A, the second model 432B, and/or the Nth model 432N may be used by the perception component 422 to alter or modify an amount of perception performed based on satellite data from satellite(s) having line of sight (versus multiple paths to the vehicle 402. For example, the model component 430 may communicate an output to the perception component 422 to cause an update to one or more parameters (e.g., bias values, drift values, and the like) associated with the sensor system(s) 406.

In some examples, the planning component 424 may determine one or more actions (e.g., reference actions and/or sub-actions) for the vehicle 402 based at least in part on output(s) from the model component 430. In some examples, the model component 430 may be configured to output information indicating a vehicle position to the planning component 424 for use in planning operations (e.g., determining one or more trajectories). In some examples, the model component 430 may include at least the functionality provided by the model component 104 of FIG. 1.

In various examples, the model component 430 may utilize machine learning techniques to determine an object intent, a node of a decision tree, a vehicle trajectory, an object position, an intersection probability, and so on, as described with respect to FIG. 1 and elsewhere. In such examples, machine learning algorithms may be trained to predict a vehicle trajectory with improved accuracy over time.

The vehicle safety system 434 may include an object trajectory component 440 configured to determine a trajectory for the vehicle 402 and/or trajectories for other objects identifying within an environment, using the various systems and techniques described herein. In some examples, the object trajectory component 440 may receive planning data, perception data, and/or map data from the components 420-426 to determine a planned trajectory for the vehicle 402 and trajectories for the other objects in the environment.

In some examples, the object trajectory component 440 determine a single planned trajectory for the vehicle 402 (e.g., based on planning data and map data received from the planning component 424 and maps 428, and may determine multiple trajectories for one or more other moving objects in the environment in which the vehicle 402 is operating. In some examples, the trajectories of another object may include any number of possible paths in which the object may travel from a current position (e.g., at the time of perception) and/or based on a direction of travel. Based on the determination that the agent is within the threshold distance or time to the vehicle 402, the object trajectory component 440 may determine the trajectories associated with the object. In some examples, the object trajectory component 440 may be configured to determine the possible trajectories of each detected moving object in the environment.

In various examples, the action component 446 may determine one or more actions for the vehicle 402 to take, based on predictions and/or probability determinations of an intersection between the vehicle 402 another object (e.g., vehicle 102), along with other factors. The action may include slowing the vehicle to yield to the object, stopping the vehicle to yield to the object, changing lanes or swerving left, or changing or swerving lanes right, etc. Based on the determined action, the vehicle computing device(s) 404, such as through the system controller(s) 426, may cause the vehicle 402 to perform the action. In at least some examples, such an action may be based on the probability of collision, determined by the probability component 444 based on multiple trajectories for the object, as described in detail. In various examples, responsive to determining to adjust a lateral position of the vehicle, such as in a lane change to the left or to the right, the vehicle safety system 434 may cause the components 440-446 to generate an updated vehicle trajectory, plot additional object trajectories with respect to the updated vehicle trajectory, determine updated potential collision zones, and perform time-space overlap analyses to determine whether an intersection risk may still exist after the determined action is performed by the vehicle 402.

The action component 446 may determine, in some examples, one or more actions for the vehicle 402 to take, based on receiving a signal form the model component 430. For instance, the model component 430 can determine an intersection probability between the vehicle 402 and one or more objects and generate a signal for sending to the action component 446.

As can be understood, the components discussed herein (e.g., the localization component 420, the perception component 422, the planning component 424, the one or more system controllers 426, the one or more maps 428, and the vehicle safety system 434 including the object trajectory component 440, the intersection component 442, the probability component 444, and the action component 446 are described as divided for illustrative purposes. However, the operations performed by the various components may be combined or performed in any other component.

In some instances, aspects of some or all of the components discussed herein may include any models, techniques, and/or machine learned techniques. For example, in some instances, the components in the memory 418 (and the memory 448, discussed below) may be implemented as a neural network.

As described herein, an exemplary neural network is a biologically inspired technique which passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), Ada-Boost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 406 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 406 may include multiple instances of each of these or other types of sensors. For instance, the lidar sensors may include individual lidar sensors located at the corners, front, back, sides, and/or top of the vehicle 402. As another example, the camera sensors may include multiple cameras disposed at various locations about the exterior and/or interior of the vehicle 402. The sensor system(s) 406 may provide input to the vehicle computing device 404. Additionally, or in the alternative, the sensor system(s) 406 may send sensor data, via the one or more networks 456, to the one or more computing device(s) 450 at a particular frequency, after a lapse of a predetermined period of time, in near real-time, etc. In some examples, the model component 430 may receive sensor data from one or more of the sensor system(s) 406.

The vehicle 402 may also include one or more emitters 408 for emitting light and/or sound. The emitters 408 may include interior audio and visual emitters to communicate with passengers of the vehicle 402. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 408 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 402 may also include one or more communication connections 410 that enable communication between the vehicle 402 and one or more other local or remote computing device(s). For instance, the communication connection(s) 410 may facilitate communication with other local computing device(s) on the vehicle 402 and/or the drive system(s) 414. Also, the communication connection(s) 410 may allow the vehicle to communicate with other nearby computing device(s) (e.g., remote computing device 450, other nearby vehicles, etc.) and/or one or more remote sensor system(s) 458 for receiving sensor data. The communication connection(s) 410 also enable the vehicle 402 to communicate with a remote teleoperations computing device or other remote services.

The communication connection(s) 410 may include physical and/or logical interfaces for connecting the vehicle computing device 404 to another computing device or a network, such as network(s) 456. For example, the communication connection(s) 410 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 402 may include one or more drive systems 414. In some examples, the vehicle 402 may have a single drive system 414. In at least one example, if the vehicle 402 has multiple drive systems 414, individual drive systems 414 may be positioned on opposite ends of the vehicle 402 (e.g., the front and the rear, etc.). In at least one example, the drive system(s) 414 may include one or more sensor systems to detect conditions of the drive system(s) 414 and/or the surroundings of the vehicle 402. By way of example and not limitation, the sensor system(s) may include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 414. In some cases, the sensor system(s) on the drive system(s) 414 may overlap or supplement corresponding systems of the vehicle 402 (e.g., sensor system(s) 406).

The drive system(s) 414 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 414 may include a drive system controller which may receive and preprocess data from the sensor system(s) and to control operation of the various vehicle systems. In some examples, the drive system controller may include one or more processors and memory communicatively coupled with the one or more processors. The memory may store one or more modules to perform various functionalities of the drive system(s) 414. Furthermore, the drive system(s) 414 may also include one or more communication connection(s) that enable communication by the respective drive system with one or more other local or remote computing device(s).

In at least one example, the direct connection 412 may provide a physical interface to couple the one or more drive system(s) 414 with the body of the vehicle 402. For example, the direct connection 412 may allow the transfer of energy, fluids, air, data, etc. between the drive system(s) 414 and the vehicle. In some instances, the direct connection 412 may further releasably secure the drive system(s) 414 to the body of the vehicle 402.

In at least one example, the localization component 420, the perception component 422, the planning component 424, the one or more system controllers 426, the one or more maps 428, and the model component 430, may process sensor data, as described above, and may send their respective outputs, over the one or more network(s) 456, to the computing device(s) 450. In at least one example, the localization component 420, the perception component 422, the planning component 424, the one or more system controllers 426, the one or more maps 428, and the model component 430 may send their respective outputs to the computing device(s) 450 at a particular frequency, after a lapse of a predetermined period of time, in near real-time, etc.

In some examples, the vehicle 402 may send sensor data to the computing device(s) 450 via the network(s) 456. In some examples, the vehicle 402 may receive sensor data from the computing device(s) 450 and/or remote sensor system(s) 458 via the network(s) 456. The sensor data may include raw sensor data and/or processed sensor data and/or representations of sensor data. In some examples, the sensor data (raw or processed) may be sent and/or received as one or more log files.

The computing device(s) 450 may include processor(s) 452 and a memory 448 storing a training component 454.

In some instances, the training component 454 can include functionality to train a machine learning model to output values, parameters, and the like associated with one or more algorithms. For example, the training component 454 can receive data that represents log data (e.g., publicly available data, sensor data, and/or a combination thereof) associated with a real-world environment. At least a portion of the log data can be used as an input to train the machine learning model. As a non-limiting example, sensor data, audio data, image data, map data, inertia data, vehicle state data, historical data (log data), or a combination thereof may be input into the machine learned model. Thus, by providing data where the vehicle traverses an environment, the training component 454 can be trained to determine elevation data, region data, and/or position data usable in the real-world environment, as discussed herein.

In some examples, the training component 454 may be implemented to train the model component 430. Training data may include a wide variety of data, such as image data, video data, lidar data, radar data, audio data, other sensor data, observed trajectories of objects, labelled data (e.g., labelled collision data, labelled object intent data), etc., that is associated with a value (e.g., a desired classification, inference, prediction, etc.). Such data and associated values may generally be referred to as a "ground truth." In such examples, the training component 454 may determine a difference between the ground truth (e.g., training data) and output(s) by the model component 430. Based at least in part on the difference(s), training by the training component 454 may include altering a parameter of the machine-learned model to minimize the difference(s) to obtain a trained machine-learned model that is configured to determine elevation masks and/or line of sight regions proximate the vehicle 402.

In various examples, during training, the model component 430 may adjust weights, filters, connections between layers, and/or parameters for training the individual untrained neural networks to predict potential intersection(s) (or other tasks), as discussed herein. In some instances, the model component 430 may use supervised or unsupervised training.

In some examples, the training component 454 can include training data that has been generated by a simulator. For example, simulated training data can represent examples where a vehicle collides with an object in an environment or nearly collides with an object in an environment, to provide additional training examples.

In some examples, functionality provided by the training component 454 may be included and/or performed by the vehicle computing device 404.

The processor(s) 416 of the vehicle 402, processor(s) 436 of the vehicle safety system 434, and/or the processor(s) 452 of the computing device(s) 450 may be any suitable processor capable of executing instructions to process data and perform operations as described herein. By way of example and not limitation, the processor(s) 416, 436, and 452 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 418, memory 438, and memory 448 are examples of non-transitory computer-readable media. The memory 418, the memory 438, and/or memory 448 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 418, the memory 438, and memory 448 may include at least a working memory and a storage memory. For example, the working memory may be a high-speed memory of limited capacity (e.g., cache memory) that is used for storing data to be operated on by the processor(s) 416, 436, and/or 452. In some instances, the memory 418, the memory 438, and memory 448 may include a storage memory that may be a lower-speed memory of relatively large capacity that is used for long-term storage of data. In some cases, the processor(s) 416, 436, and/or 452 cannot operate directly on data that is stored in the storage memory, and data may need to be loaded into a working memory for performing operations based on the data, as discussed herein.

It should be noted that while FIG. 4 is illustrated as a distributed system, in alternative examples, components of the vehicle 402 may be associated with the computing device(s) 450 and/or components of the computing device(s) 450 may be associated with the vehicle 402. That is, the vehicle 402 may perform one or more of the functions associated with the computing device(s) 450, and vice versa. For instance, either the vehicle 402 and/or the computing device(s) 450 may perform training operations relating to one or more of the models described herein.

Figure 5:
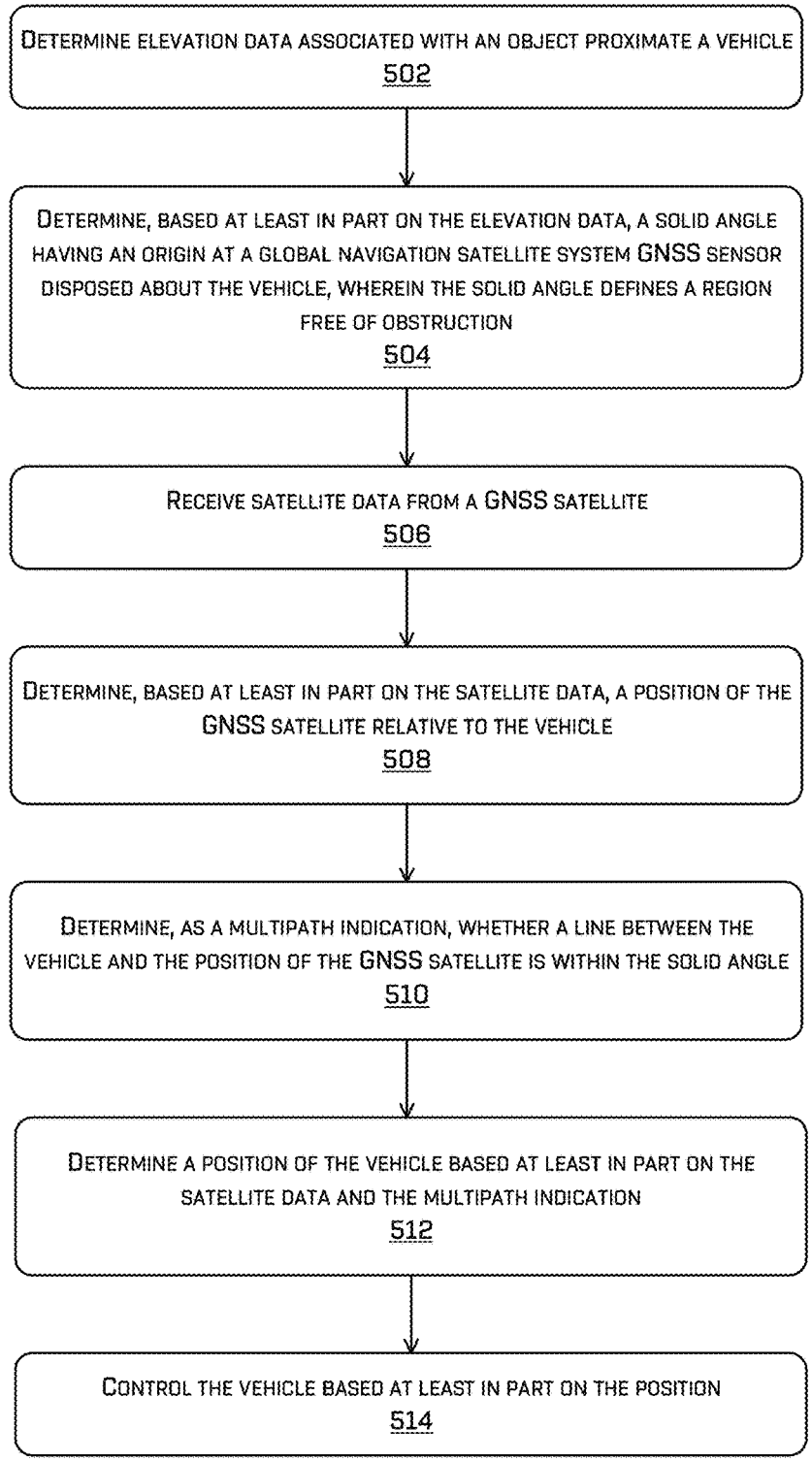
FIG. 5 is a flowchart depicting an example process for determining a vehicle position using one or more example models.

FIG. 5 is a flowchart depicting an example process 500 for determining a vehicle position using one or more example models. Some or all of the process 500 may be performed by one or more components in FIGS. 1-5, as described herein. For example, some or all of process 500 may be performed by the vehicle computing device 404 of FIG. 4 and/or the computing device(s) 450.

At operation 502, the process may include determining elevation data associated with an object proximate a vehicle. For example, the vehicle computing device 404 can implement the model component 430 to receive, generate, or otherwise determine a height of one or more objects proximate the vehicle. In some examples, the model component 430 can determine elevation data for the objects surrounding the vehicle including a maximum height for at least one object. For instance, the model component 430 can determine an elevation mask indicating the elevations of various objects that may obstruct or block signals from a satellite. The elevation mask can be determined based at least in part on one or more of: sensor data from one or more sensors, elevation data from a third-party application or third-party service, historical elevation data associated with the objects (s), map data, and so on.

In some examples, the model component 430 can receive the map data from the map(s) 428 representing a roadway, crosswalk, traffic information, etc. of the environment surrounding the vehicle. In some examples, the map data can represent objects detected based at least in part on the sensor data such as buildings, trees, other vehicles, traffic signs, etc. In various examples, the map data can indicate elevation information for objects in the environment including how the elevation reading may be affected by time of day, month, year, and so on. As described above, a localization may be performed independent of the GNSS (or using whatever GNSS is available, irrespective of multipath issues) to determine a location of the vehicle. Such a location may, in turn, be used to query the map, historical data, third party data, etc.

At operation 504, the process may include determining, based at least in part on the elevation data, a solid angle having an origin at a global navigation satellite system GNSS sensor disposed about the vehicle, wherein the solid angle defines a region free of obstruction. For instance, the model component 430 can determine a region associated with an unobstructed field of view to the sky based on a solid angle originating at the GNSS sensor. For example, the model component 430 can identify an area (e.g., the region 208, the line of sight region 308) that signals can be received directly from a satellite positioned within bounds of the area.

At operation 506, the process may include receiving satellite data from a GNSS satellite. For example, the model component 430 can receive signal data from one or more satellites in orbit as the vehicle navigates in an environment. The satellite data can indicate information (e.g., a time, a position, etc.) about the satellite and/or an object detected by the satellite. For instance, the satellite data can represent determinations by the satellite about the vehicle 402 (e.g., a position) and/or signal information used when determining the vehicle position, an identifier of the satellite, etc.)

At operation 508, the process may include determining, based at least in part on the satellite data, a position of the GNSS satellite relative to the vehicle. For instance, the operation 508 can include the model component 430 receiving position information associated with the GNSS satellite as part of the received satellite data. In some examples, the satellite position can be determined by receiving position data from a server associated with the GNSS system that maintains orbit and position information for different satellites over time.

At operation 510, the process may include determining, as a multipath indication, whether a line between the vehicle and the position of the GNSS satellite is within the solid angle. For instance, the operation 510 can include the model component 430 determining whether a position of the satellite is inside or outside bounds of the solid angle associated with an unobstructed field of view to the sky. If the position of the satellite is inside the bounds of a region defined by the solid angle, the satellite includes a single path to the vehicle and if the position of the satellite is outside the bounds of the region defined by the solid angle, the satellite includes a multiple path having at least one path associated with a reflective surface. In some examples, the model component 430 can determine, based at least in part on a line between the vehicle and the satellite passing through an area free of obstructions, that the signal from the satellite includes a single path to the surface of the vehicle. Generally, the multipath indication can be indicative of a) a single path if the line is within the solid angle having an origin at a global navigation satellite system sensor disposed about the vehicle, or b) a reflection if the line is not within the solid angle.

At operation 512, the process may include determining a position of the vehicle based at least in part on the satellite data and the multipath indication. For example, the operation 512 may include the model component 430 determining a current position for the vehicle (updating a previous vehicle position to the current position) using a first weight assigned to single signal data associated with a satellite having line of sight to the vehicle and optionally a second weight assigned to the multiple path signal. In various examples, the position of the vehicle can be determined by excluding or down-weighting multipath signal data (relative to the weight assigned to the single path signal) such that the down-weighted signal data contributes less to the final determination of localization of the vehicle.

At operation 514, the process may include controlling the vehicle based at least in part on the position of the vehicle. For example, a component of the vehicle computing device (s) 404 can receive the position of the vehicle as input for determining an output that controls some operation of the vehicle such as a braking system, a steering system, a propulsion system, a perception system, a localization system, and the like. In various examples, a planning component (e.g., planning component 424) of the vehicle computing device(s) 404 may use the predictions received from the model component 430 during planning operations such as to determine a trajectory for the vehicle.

In various examples, the vehicle computing device(s) 404 is configured to send an output from the model component 430 to the perception component 422 or the planning component 424, just to name a few. In various examples, the vehicle computing device may control operation of the vehicle, such as the planning component 424 determining a trajectory for the vehicle based at least in part on an output from the model component 430 (e.g., a reference vehicle position usable for determining the vehicle trajectory). In this way, the vehicle computing device(s) 404 may determine a vehicle trajectory that improves vehicle safety by planning for vehicle actions with greater precision and in less time versus techniques that rely on multipath signal data.

FIGS. 2 and 5 illustrate example processes in accordance with examples of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes. In some embodiments, one or more operations of the method may be omitted entirely. Moreover, the methods described herein can be combined in whole or in part with each other or with other methods.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Example Clauses

Any of the example clauses in this section may be used with any other of the example clauses and/or any of the other examples or embodiments described herein.

A: A system comprising: one or more processors; and one or more non-transitory computer-readable media storing instructions executable by the one or more processors, wherein the instructions, when executed, cause the one or more processors to perform operations comprising: determining elevation data associated with an object proximate a vehicle; determining, based at least in part on the elevation data, a solid angle having an origin at a global navigation satellite system (GNSS) sensor disposed about the vehicle, wherein the solid angle defines a region free of obstruction; receiving satellite data from a GNSS satellite; determining, based at least in part on the satellite data, a position of the GNSS satellite relative to the vehicle; determining, as a multipath indication, whether a line between the vehicle and the position of the GNSS satellite is within the solid angle; determining a position of the vehicle based at least in part on the satellite data and the multipath indication; and controlling the vehicle based at least in part on the position.

B: The system of paragraph A, wherein the multipath indication is indicative of a single path if the line is within the solid angle and a reflection otherwise.

C: The system of paragraph B, the operations further comprising: associating a first weight for satellite data associated with the single path and a second weight for satellite data associated with a multiple path to a surface of the vehicle, the second weight lower than the first weight.

D: The system of paragraph B or C, the operations further comprising: determining to exclude or down-weight satellite data associated with the reflection.

E: The system of any of paragraphs A-D, wherein: determining the elevation data comprises generating an elevation mask based at least in part on a maximum elevation angle of a lidar sensor associated with a valid return and map data, and the map data is based at least in part on at least one of sensor data from one or more sensors associated with a vehicle or historical data.

F: One or more non-transitory computer-readable media storing instructions that, when executed, cause one or more processors to perform operations comprising: determining elevation information for an object in an environment proximate a vehicle; determining, based at least in part on the elevation information, a region above the vehicle that is unobstructed by the object; receiving satellite data from a satellite; determining a position of the satellite; determining a line passing from the satellite to a sensor associated with the vehicle; determining, as a multipath indication, whether the line is within the region; and determining a position of the vehicle based at least in part on the satellite data and the multipath indication.

G: The one or more non-transitory computer-readable media of paragraph F, the operations further comprising one or more of: associating, based at least in part on the multipath indication being associated with the line being within the region, a first weight with the satellite data, or associating, based at least in part on the multipath indication being associated with the line being outside the region, a second weight with the satellite data.

H: The one or more non-transitory computer-readable media of paragraph F or G, wherein the multipath indication is indicative of a single path if the line is within a solid angle having an origin at a global navigation satellite system sensor disposed about the vehicle and a reflection otherwise.

I: The one or more non-transitory computer-readable media of paragraph G, wherein the first weight is higher than the second weight, and the operations further comprising: outputting one or more of the first weight or the second weight to a vehicle computing device configured to control operation of the vehicle.

J: The one or more non-transitory computer-readable media of any of paragraphs F-I, the operations further comprising: storing, as map data, the elevation information and line of sight information associated with the satellite; and transmitting the map data to be used by an additional vehicle.

K: The one or more non-transitory computer-readable media of any of paragraphs F-J, wherein determining the elevation information comprises generating an elevation mask based at least in part on a maximum elevation angle of a valid lidar return of a lidar sensor associated with the vehicle.

L: The one or more non-transitory computer-readable media of any of paragraphs F-K, wherein determining the elevation information comprises receiving elevation data from a service or an application remote from the vehicle.

M: The one or more non-transitory computer-readable media of any of paragraphs F-L, wherein the object includes a building, a bus, a truck, a trailer, a sign, a glass surface, a reflective surface, a tunnel, a bridge, or a plant.

N: The one or more non-transitory computer-readable media of any of paragraphs F-M, wherein the operations further comprise: receiving lidar data; and determining, based at least in part on the lidar data, that a number of objects in the environment that exceeds a threshold number of objects.

O: The one or more non-transitory computer-readable media of any of paragraphs F-N, the operations further comprising: determining to exclude the satellite data based at least in part on: the multipath indication associated with the line being outside of the region; and receiving additional satellite data from an additional satellite.

P: The one or more non-transitory computer-readable media of any of paragraphs F-O, wherein the elevation information is associated with a first time, and the operations further comprising: determining memory resources to process data from the satellite based at least in part on one of: the position of the satellite being inside the region or the position of the satellite being outside the region.

Q: A method comprising: determining elevation information for an object in an environment proximate a vehicle; determining, based at least in part on the elevation information, a region above the vehicle that is unobstructed by the object; receiving satellite data from a satellite; determining a position of the satellite; determining a line passing from the satellite to a sensor associated with the vehicle; determining, as a multipath indication, whether the line is within the region; and determining a position of the vehicle based at least in part on the satellite data and the multipath indication.

R: The method of paragraph Q, further comprising one or more of: associating, based at least in part on the multipath indication being associated with the line being within the region, a first weight with the satellite data, or associating, based at least in part on the multipath indication being associated with the line being outside the region, a second weight with the satellite data.

S: The method of paragraph Q or R, wherein the multipath indication is indicative of a single path if the line is within a solid angle having an origin at a global navigation satellite system sensor disposed about the vehicle and a reflection otherwise.

T: The method of any of paragraphs Q-S, further comprising: determining to exclude signal data from the satellite outside the region from being used in the vehicle position determination.

While the example clauses described below are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. One or more non-transitory computer-readable media storing instructions that, when executed, cause one or more processors to perform operations comprising:
   determining elevation information for an object in an environment proximate a vehicle;
   determining, based at least in part on the elevation information, a region above the vehicle that is unobstructed by the object;
   receiving satellite data from a satellite;
   determining a position of the satellite;
   determining a line passing from the satellite to a sensor associated with the vehicle;
   determining, as a multipath indication, whether the line is within the region;
   determining a position of the vehicle based at least in part on the satellite data and the multipath indication; and
   storing, as map data, the elevation information and line of sight information associated with the satellite.

2. The one or more non-transitory computer-readable media of claim 1, the operations further comprising one or more of:
   associating, based at least in part on the multipath indication being associated with the line being within the region, a first weight with the satellite data, or
   associating, based at least in part on the multipath indication being associated with the line being outside the region, a second weight with the satellite data.

3. The one or more non-transitory computer-readable media of claim 1, wherein the multipath indication is indicative of a single path if the line is within a solid angle having an origin at a global navigation satellite system sensor disposed about the vehicle and a reflection otherwise.

4. The one or more non-transitory computer-readable media of claim 2, wherein the first weight is higher than the second weight, and the operations further comprising:
   outputting one or more of the first weight or the second weight to a vehicle computing device configured to control operation of the vehicle.

5. The one or more non-transitory computer-readable media of claim 1, the operations further comprising:
   transmitting the map data to be used by an additional vehicle.

6. The one or more non-transitory computer-readable media of claim 1, wherein determining the elevation information comprises generating an elevation mask based at least in part on a maximum elevation angle of a valid lidar return of a lidar sensor associated with the vehicle.

7. The one or more non-transitory computer-readable media of claim 1, wherein determining the elevation information comprises receiving elevation data from a service or an application remote from the vehicle.

8. The one or more non-transitory computer-readable media of claim 1, wherein the object includes a building, a bus, a truck, a trailer, a sign, a glass surface, a reflective surface, a tunnel, a bridge, or a plant.

9. The one or more non-transitory computer-readable media of claim 1, wherein the operations further comprise:
   receiving lidar data; and
   determining, based at least in part on the lidar data, that a number of objects in the environment that exceeds a threshold number of objects.

10. The one or more non-transitory computer-readable media of claim 1, the operations further comprising:
    determining to exclude the satellite data based at least in part on:
       the multipath indication associated with the line being outside of the region; and
       receiving additional satellite data from an additional satellite.

11. The one or more non-transitory computer-readable media of claim 1, wherein the elevation information is associated with a first time, and the operations further comprising:
    determining memory resources to process data from the satellite based at least in part on one of: the position of the satellite being inside the region or the position of the satellite being outside the region.

12. A method comprising:
    determining elevation information for an object in an environment proximate a vehicle;
    determining, based at least in part on the elevation information, a region above the vehicle that is unobstructed by the object;
    receiving satellite data from a satellite;
    determining a position of the satellite;
    determining a line passing from the satellite to a sensor associated with the vehicle;
    determining, as a multipath indication, whether the line is within the region;
    determining a position of the vehicle based at least in part on the satellite data and the multipath indication; and
    storing, as map data, the elevation information and line of sight information associated with the satellite.

13. The method of claim 12, further comprising one or more of:

associating, based at least in part on the multipath indication being associated with the line being within the region, a first weight with the satellite data, or associating, based at least in part on the multipath indication being associated with the line being outside the region, a second weight with the satellite data.

14. The method of claim 12, wherein the multipath indication is indicative of a single path if the line is within a solid angle having an origin at a global navigation satellite system sensor disposed about the vehicle and a reflection otherwise.

15. The method of claim 12, further comprising:

determining to exclude signal data from the satellite outside the region from being used in the vehicle position determination.

16. A system comprising:

one or more processors; and one or more non-transitory computer-readable media storing instructions executable by the one or more processors, wherein the instructions, when executed, cause the one or more processors to perform operations comprising:

determining elevation information for an object in an environment proximate a vehicle;

determining, based at least in part on the elevation information, a region above the vehicle that is unobstructed by the object;

receiving satellite data from a satellite;

determining a position of the satellite;

determining a line passing from the satellite to a sensor associated with the vehicle;

determining, as a multipath indication, whether the line is within the region;

determining a position of the vehicle based at least in part on the satellite data and the multipath indication; and storing, as map data, the elevation information and line of sight information associated with the satellite.

17. The system of claim 16, the operations further comprising:

associating, based at least in part on the multipath indication being associated with the line being within the region, a first weight with the satellite data, or associating, based at least in part on the multipath indication being associated with the line being outside the region, a second weight with the satellite data.

18. The system of claim 16, wherein the multipath indication is indicative of a single path if the line is within a solid angle having an origin at a global navigation satellite system sensor disposed about the vehicle and a reflection otherwise.

19. The system of claim 16, the operations further comprising:

transmitting the map data to be used by an additional vehicle.

20. The system of claim 16, wherein determining the elevation information comprises generating an elevation mask based at least in part on a maximum elevation angle of a valid lidar return of a lidar sensor associated with the vehicle.

* * * * *